United States Patent
Newstadt et al.

(10) Patent No.: US 8,266,306 B2
(45) Date of Patent: Sep. 11, 2012

(54) SYSTEMS AND METHODS FOR DELEGATING ACCESS TO ONLINE ACCOUNTS

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 348 days.

(21) Appl. No.: 11/967,631

(22) Filed: Dec. 31, 2007

(65) Prior Publication Data

US 2009/0172793 A1 Jul. 2, 2009

(51) Int. Cl.
*G06F 15/16* (2006.01)

(52) U.S. Cl. ........ 709/229; 709/201; 709/202; 709/225; 709/226; 709/227

(58) Field of Classification Search .................... 709/200
See application file for complete search history.

(56) References Cited

U.S. PATENT DOCUMENTS

| | | | |
|---|---|---|---|
| 6,073,242 A * | 6/2000 | Hardy et al. .................. | 726/1 |
| 2002/0174048 A1 * | 11/2002 | Dheer et al. .................. | 705/36 |
| 2006/0225132 A1 * | 10/2006 | Swift et al. .................. | 726/11 |
| 2006/0282377 A1 * | 12/2006 | Edwards et al. ............... | 705/39 |
| 2007/0289002 A1 * | 12/2007 | van der Horst et al. ......... | 726/9 |
| 2008/0134295 A1 * | 6/2008 | Bailey et al. .................. | 726/4 |
| 2008/0313447 A1 * | 12/2008 | Gillett et al. .................. | 713/1 |

FOREIGN PATENT DOCUMENTS

GB 2411253 8/2005

OTHER PUBLICATIONS

Search Report and Written Opinion in related International Application No. PCT/US2008/086410.

* cited by examiner

*Primary Examiner* — Thu Nguyen
*Assistant Examiner* — Neeraj Utreja
(74) *Attorney, Agent, or Firm* — Advantedge Law Group

(57) ABSTRACT

Computer-implemented methods for delegating access to online accounts and for facilitating delegates' access to these online accounts are disclosed. In one embodiment, a method for delegating access to an online account comprises receiving a request to delegate access to a first online account to a first delegate, identifying the first online account, identifying a contact record for the first delegate, and delegating access to the first online account to the first delegate by associating the contact record for the first delegate with the first online account. Corresponding systems and computer-readable media are also disclosed.

17 Claims, 13 Drawing Sheets

| Delegated-Accounts Table 142 | | |
|---|---|---|
| Account | Delegate | Expiration |
| 1) | | |
| 2) | | |
| 3) | | |

| Accessible-Accounts Table 144 | | |
|---|---|---|
| Account | Delegator | Expiration |
| 1) | | |
| 2) | | |
| 3) | | |

*FIG. 2B*

| Online Accounts 802 | Delegates 804 | Actions 806 |
|---|---|---|
| Online Banking Site | Susan B. Brown | Modify Access / Revoke Access |
| | John R. Smith | Modify Access / Revoke Access |
| | | Add Delegate / Add/Modify/Delete Credentials |
| E-mail Account | Jason Roberts | Modify Access / Revoke Access |
| | | Add Delegate / Add/Modify/Delete Credentials |

Website 800

FIG. 8

SYSTEMS AND METHODS FOR DELEGATING ACCESS TO ONLINE ACCOUNTS

BACKGROUND

Individuals commonly use the Internet to access online accounts, such as bank accounts, credit card accounts, web-based email accounts, and the like. In certain circumstances, a user may want to allow others to access these online accounts. For example, a husband may want to share a bank account with his wife, a parent may want to share a credit card account with a child, and a user may want to share his or her financial accounts with an accountant for the duration of the tax season.

Currently, users typically share access to their online accounts by manually sharing their login information (or "credentials") with another user (the "delegate"). Unfortunately, once shared, users can no longer control the use of credentials by delegates, which may result in a variety of security concerns. For example, delegates may use insecure mechanisms to store credentials. For example, delegates may insecurely store passwords on their computer (such as in an unencrypted text file) or write passwords on insecurely stored paper (such as sticky notes attached to or left in the vicinity of the delegate's computer).

Moreover, the conventional mechanisms used to revoke a delegate's access to an online account may be inefficient and insecure. For example, for certain online accounts, a user may be required to change his or her login information in order to revoke the delegate's access to the online account. In addition, because users often use identical login information for multiple online accounts, an account owner that shares credentials for one account with a delegate may inadvertently share credentials for other accounts as well.

SUMMARY

As will be described in greater detail below, embodiments of the instant disclosure may enable users to securely delegate access to their online accounts. Similarly, embodiments of the instant disclosure may enable a delegate to securely access online accounts to which he or she has been delegated access to by an account owner.

For example, a computer-implemented method for delegating access to online accounts may comprise receiving a request to delegate access to a user's online account to a delegate. A server may then delegate access to the delegate by associating the delegate with the user's online account. In one example, the server may associate the delegate with the user's online account by creating an entry in a database that identifies an association between the user's online account and the delegate.

In one example, a user may specify a date on which a delegate's access to the online account may expire. In addition, a user may revoke a delegate's access to the online account by requesting that a server disassociate the delegate from the online account. In at least one embodiment, upon delegating access to an online account to a delegate, the server may transmit a notification to the delegate that identifies the online account to which the delegate has been granted access.

Embodiments of the instant disclosure may also enable a delegate to securely access online accounts. For example, a server may facilitate a delegate's request to access an online account by retrieving credentials for the online account from a credentials database, accessing the online account using the credentials, and then proxying traffic between the online account and the delegate. Alternatively, a module (such as a plugin) running on a delegate's computer may retrieve credentials for an online account from a database and then access the online account using these credentials without exposing the credentials to the delegate.

Embodiments of the instant disclosure may also comprise providing a website for facilitating access to the various systems and methods described herein. Corresponding systems and computer-readable media are also disclosed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 2B is a block diagram of an exemplary delegated-accounts table and an accessible-accounts table containing account-delegate associations.

FIG. 8 is a block diagram of an exemplary web page for delegating access to online accounts and for facilitating delegates' access to these online accounts according to at least one embodiment.

Figure 1:
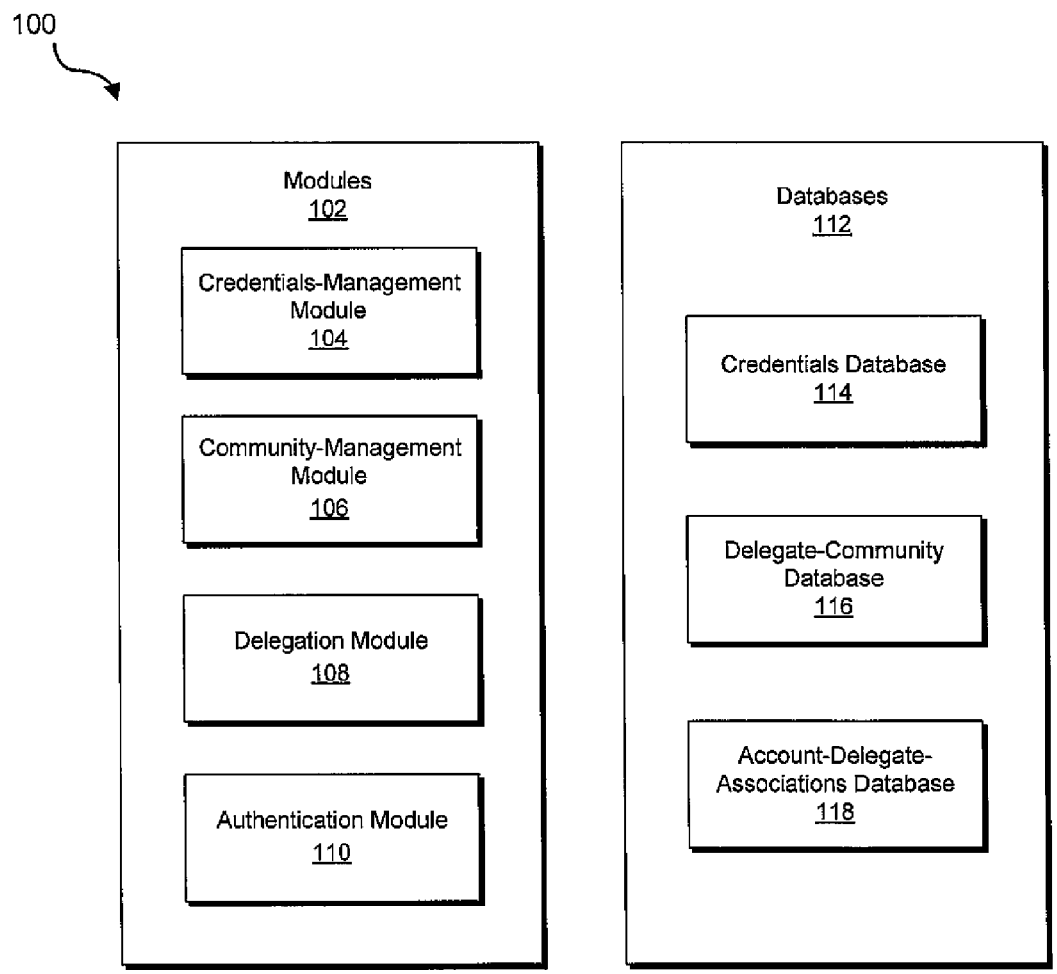
FIG. 1 is a block diagram of an exemplary system for delegating access to online accounts and for facilitating delegates' access to these online accounts according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, embodiments of the instant disclosure may enable users to securely delegate access to their online accounts. Similarly, embodiments of the instant disclosure may enable a delegate to securely access online accounts to which he or she has been delegated access to by an account owner.

Figure 2A:
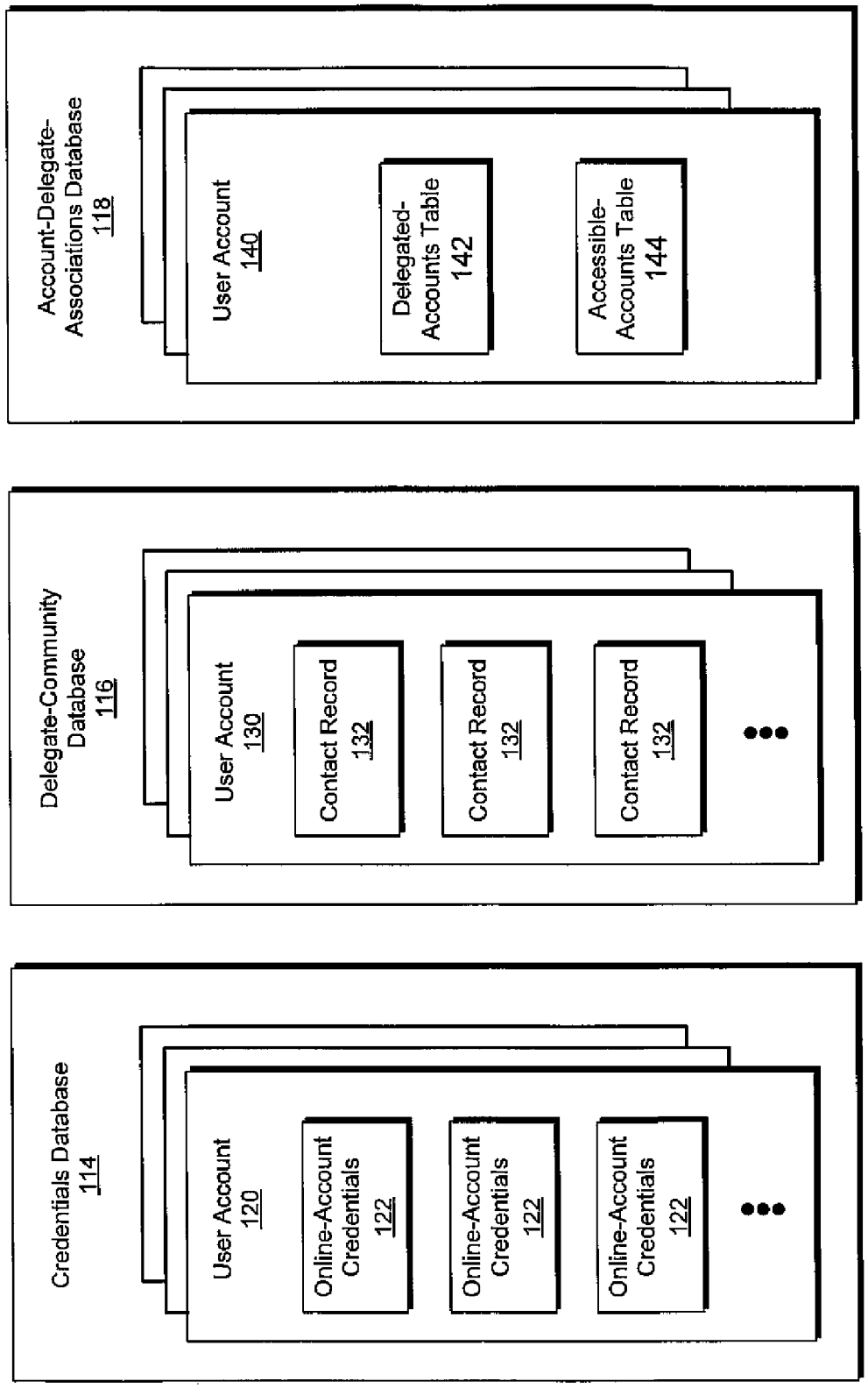
FIG. 2A is a block diagram of exemplary databases for storing online-account credentials, user-account-authentication information, contact records, and account-delegate associations according to certain embodiments.
Figure 3:
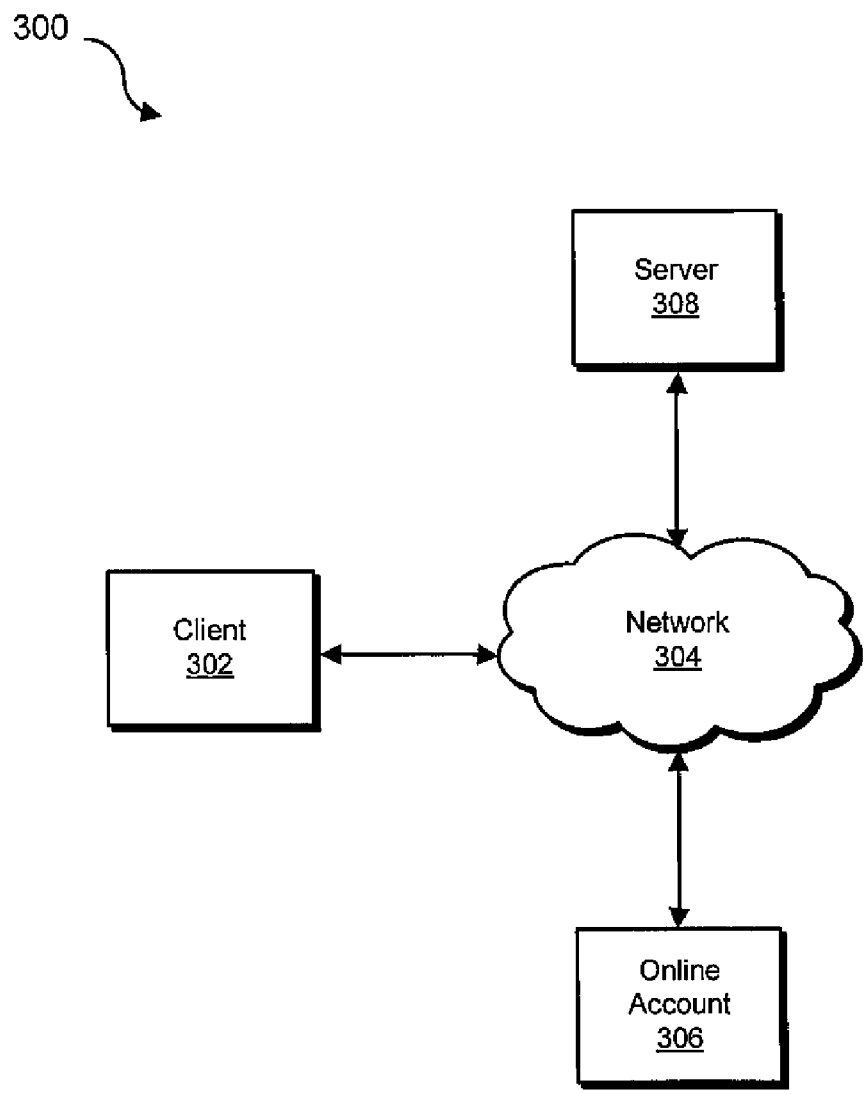
FIG. 3 is a block diagram of an exemplary network-based system for delegating access to online accounts and for facilitating delegates' access to these online accounts according to at least one embodiment.

The following will provide, with reference to FIGS. 1-3, a detailed description of exemplary systems for delegating access to online accounts and for facilitating delegates' access to these online accounts. A description of an exemplary website for facilitating user access with such systems will also be provided in connection with FIG. 8. In addition, detailed descriptions of corresponding exemplary computer-implemented methods will also be provided in connection with FIGS. 4-7 and 9.

FIG. 1 is a block diagram of an exemplary system 100 for delegating access to online accounts and for facilitating delegates' access to these online accounts. As illustrated in this figure, exemplary system 100 may comprise one or more modules for performing one or more tasks. For example, exemplary system 100 may comprise a credentials-management module 104 for managing online-account credentials and user-account-authentication information. Exemplary system 100 may also comprise a community-management module 106 for managing contact records for users and a delegation module 108 for managing associations established between online accounts and delegates (hereafter "account-delegate associations"). In addition, exemplary system 100 may also comprise an authentication module 110 for accessing online accounts using online-account credentials.

As illustrated in FIG. 1, exemplary system 100 may also comprise one or more databases 112. For example, exemplary system 100 may comprise a credentials database 114 for storing online-account credentials and user-account-authentication information. Exemplary system 100 may also comprise a delegate-community database 116 for storing contact records for users and an account-delegate-associations database 118 for storing account-delegate associations. Although illustrated as separate devices, one or more of databases 112 may represent portions of a single database or a single computing device.

The phrase "online-account credentials," as used herein, may generally refer to login or authentication information that may be used to access an online account. Examples of online-account credentials including, without limitation, user names, passwords, or any other form of login or authentication information. The phrase "online account" generally refers to a user account for an online service. Examples of online services include, without limitation, websites (such as online banking websites), web-based e-mail services, instant-messaging services, file-distribution services, or any other online service. In addition, the phrase "user-account authentication information," as used herein, generally refers to information used to authenticate the identity of a user with a system, such as system 100 in FIG. 1, for delegating access to online accounts and for facilitating delegate access to these online accounts. Examples of user-account authentication information including, without limitation, user names, passwords, or any other potentially useful authentication or login information.

In certain embodiments, one or more of modules of 102 may represent one or more software applications or programs that, when executed by a computing device, may cause the computing device to perform one or more tasks required to delegate access to online accounts and/or to access delegated online accounts. For example, as will be described in greater detail below, one or more of modules 102 may represent software modules configured to run on one or more computing devices such as client 302 in FIG. 3, server 308 in FIG. 3, computing system 1010 in FIG. 10, and/or portions of exemplary network architecture 1100 in FIG. 11. One or more of modules 102 may also represent all or portions of one or more special-purpose computers configured to perform one or more tasks required to delegate access to online accounts and/or access delegated online accounts.

In addition, one or more of databases 112 may represent a portion of one or more computing devices. For example, one or more of databases 112 may represent a portion of client 302 in FIG. 3, server 308 in FIG. 3, exemplary computing system 1010 in FIG. 10, and/or portions of exemplary network architecture 1100 in FIG. 11. Alternatively, one or more of databases 112 may represent one or more physically separate devices capable of being accessed by a computing device, such as client 302 in FIG. 3, server 308 in FIG. 3, computing system 1010 in FIG. 10, and/or portions of exemplary network architecture 1100 in FIG. 11.

FIG. 2A is a block diagram of databases 112 in FIG. 1 in further detail. As illustrated in this figure, credentials database 114 may comprise one or more online-account credentials 122 associated with one or more user accounts 120. In this example, online-account credentials 122 may represent login information or authentication information for a user's account. For example, online-account credentials 122 may represent login information for a user's online banking account, login information for a user's web-based e-mail account, or the like.

Similarly, delegate-community database 116 may comprise one or more contact records 132 associated with one or more user accounts 130. The phrase "contact record" may generally refer to a data record containing contact information for a friend, family member, or acquaintance of a user. Examples of the type of contact information that may be contained in a contact record include, without limitation, the name of a contact, an e-mail address for a contact, a phone number for a contact, a fax number for a contact, a mailing address for a contact, a website address for a contact, or any other potentially useful information.

As illustrated in FIG. 2A, account-delegate-associations database 118 may comprise one or more user accounts 140, each of which may contain a delegated-accounts table 142 and an accessible-accounts table 144. As will be described in greater detail below, and as illustrated in FIG. 2B, delegated-accounts table 142 may contain information that identifies: 1) a user's online accounts, 2) individuals that have been delegated access to these online accounts, and 3) a date or period of time after which a delegate's access to the online account will be revoked (hereafter "delegation-expiration date"). Similarly, accessible-accounts table 144 may contain information that identifies each of the online accounts that a user has been delegated access to. For example, accessible-accounts table 144 may identify one or more online accounts that a user has been delegated access to, the names of the individuals that have granted the user access to the online accounts (also referred to as the "delegator"), and a delegation-expiration date.

Exemplary system 100 in FIGS. 1-2B may be deployed in a variety of ways. For example, all or a portion of exemplary system 100 may represent portions of a network-based system. FIG. 3 is an illustration of an exemplary network-based system 300 for delegating access to online accounts and for facilitating delegates' access to these online accounts. As illustrated in this figure, exemplary system 300 may comprise a client 302 in communication with an online account 306 and a server 308 via a network 304.

Client 302 generally represents any type or form of client-side computing device capable of executing computer-readable instructions. In certain embodiments, client 302 may comprise one or more portions of exemplary system 100 in FIG. 1. For example, one or more of modules 102 in FIG. 1 may be stored and configured to run on client 302.

In at least one embodiment, client 302 may communication with online account 306 and server 308 via network 304. Network 304 generally represents any type of communication or computing network; including, for example, an intranet, a wide area network (WAN), a local area network (LAN), a personal area network (PAN), or the Internet.

Online account 306 generally represents any type or form of user account for an online service. Examples of online account 306 include, without limitation, user accounts for websites (such as online banking websites), web-based email services, instant-messaging services, file-distribution services, or any other online service.

As illustrated in FIG. 3, exemplary system 300 may also comprise a server 308. Server 308 generally represents any type or form of server-side computing device. In certain embodiments, server 308 may comprise one or more portions of exemplary system 100 in FIG. 1. For example, one or more of modules 102 from FIG. 1 may be stored and configured to run on server 308. Similarly, server 308 may comprise one or more of databases 112 in FIG. 1.

Figure 4:
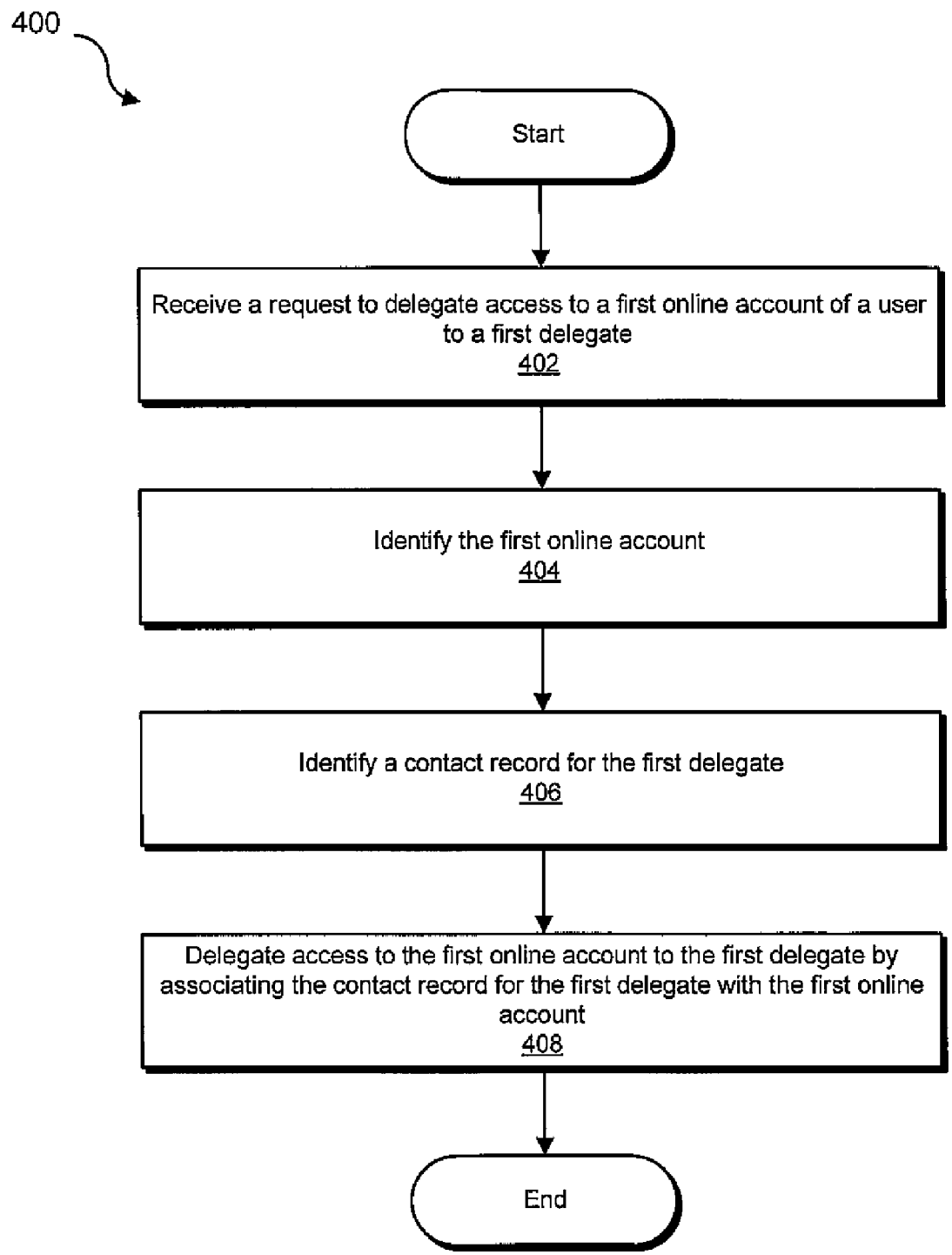
FIG. 4 is a flow diagram of an exemplary computer-implemented method for delegating access to online accounts and for facilitating delegates' access to these online accounts according to at least one embodiment.

FIG. 4 is a flow diagram of an exemplary computer-implemented method 400 for delegating access to online accounts and for facilitating delegates' access to these online accounts. As illustrated in this figure, at step 402 a computing device, such as server 308 in FIG. 3, may receive a request to delegate access to a first online account associated with a user to a first delegate. For example, server 308 in FIG. 3 may receive a request from client 302, which may be operated by a user, to delegate access to the user's online account 306 to a first delegate.

At step 404, a computing device may identify the first online account of the user. Online accounts of users may be identified in a variety of ways. For example, server 308 in FIG. 3 may identify an online-account credential 122 stored in credentials database 114 in FIG. 2A that is associated with online account 306. At step 406, a computing device may identify a contact record for the first delegate. For example, server 308 may identify a contact record 132 stored in delegate-community database 116 in FIG. 2A that corresponds to the first delegate.

At step 412, the computing device may delegate access to the first online account to the first delegate by associating the contact record for the first delegate with the first online account. Access to online accounts may be delegated in a variety of ways. For example, in certain embodiments, associating a contact record for a delegate with an online account may comprise creating an entry in a user's delegated-accounts table 142 in FIG. 2B that identifies a relationship between the user's online account and a delegate.

Delegated-accounts table 142 may also contain an entry that specifies a delegation-expiration date for the account-delegate association. As detailed above, delegation-expiration dates allows a user to specify a date or period of time after which a delegate's access to the online account will be revoked. For example, a user may delegate access to the user's online banking information to his or her accountant solely for the duration of the tax season, after which the accountant's access to the user's online banking information will be automatically revoked.

In an additional embodiment, associating the contact record for the first delegate with the first online account in step 408 may comprise creating an entry in a delegate's accessible-accounts table. For example, server 308 may delegate access to online account 306 to a delegate by retrieving an accessible-accounts table 144 from a delegate's user account 140 in account-delegate-associations database 118. Server 308 may then creating an entry in the delegate's accessible-accounts table 144 that identifies online account 306 and the name of the delegator that delegated access to online account 306. In certain embodiments, server 308 may also create an entry in accessible-accounts table 144 that specifies a delegation-expiration date. Upon completion of 408 in FIG. 4, exemplary method 400 may terminate.

For the sake of clarity, and by way of example only, the following detailed description will provide, with reference to FIGS. 1-4, an illustration of how exemplary method 400 may be implemented. In this example client 302 in FIG. 3 may represent a user's PC and online account 306 may represent a user account for an online banking website. One or more of modules 102 in FIG. 1 may be installed and configured to run on server 308, which may also comprise one or more of databases 112.

In this example, at step 402 in FIG. 4 server 308 may receive a request from client 302 in FIG. 1 to delegate access to online account 306 to a delegate. In certain embodiments, and as will be described in greater detail below in connection with FIGS. 5A and 5B, the request received from client 302 FIG. 3 may contain user-account-authentication information used to authenticate a user of client 302 with server 308.

At step 404, server 308 may identify online-account credentials 122 in user account 120 that are associated with online account 306. At step 406, server 308 may identify a contact record 132 contained within user account 130 that identifies the delegate that is to be delegated access to online account 306.

At step 408, server 308 may delegate access to online account 306 to the delegate by associating the contact record 132 for the delegate with online account 306. For example, server 308 may retrieve a delegator's delegated-accounts table 142 from the delegator's user account 140 in account-delegate-associations database 118 in FIG. 2A. Server 308 may then create an entry in the delegator's delegated-accounts table 142 that identifies an association between online account 306 and the delegate.

Server 308 may also retrieve a delegate's accessible-accounts table 144 from the delegate's user account 140 in account-delegate-associations-database 118 in FIG. 2A. Server 308 may then create an entry in accessible-accounts table 144 that identifies the online account and the name of the delegator that delegated access to the online account. Upon completion of step 408, exemplary method 400 in FIG. 4 may terminate.

Figure 5A:
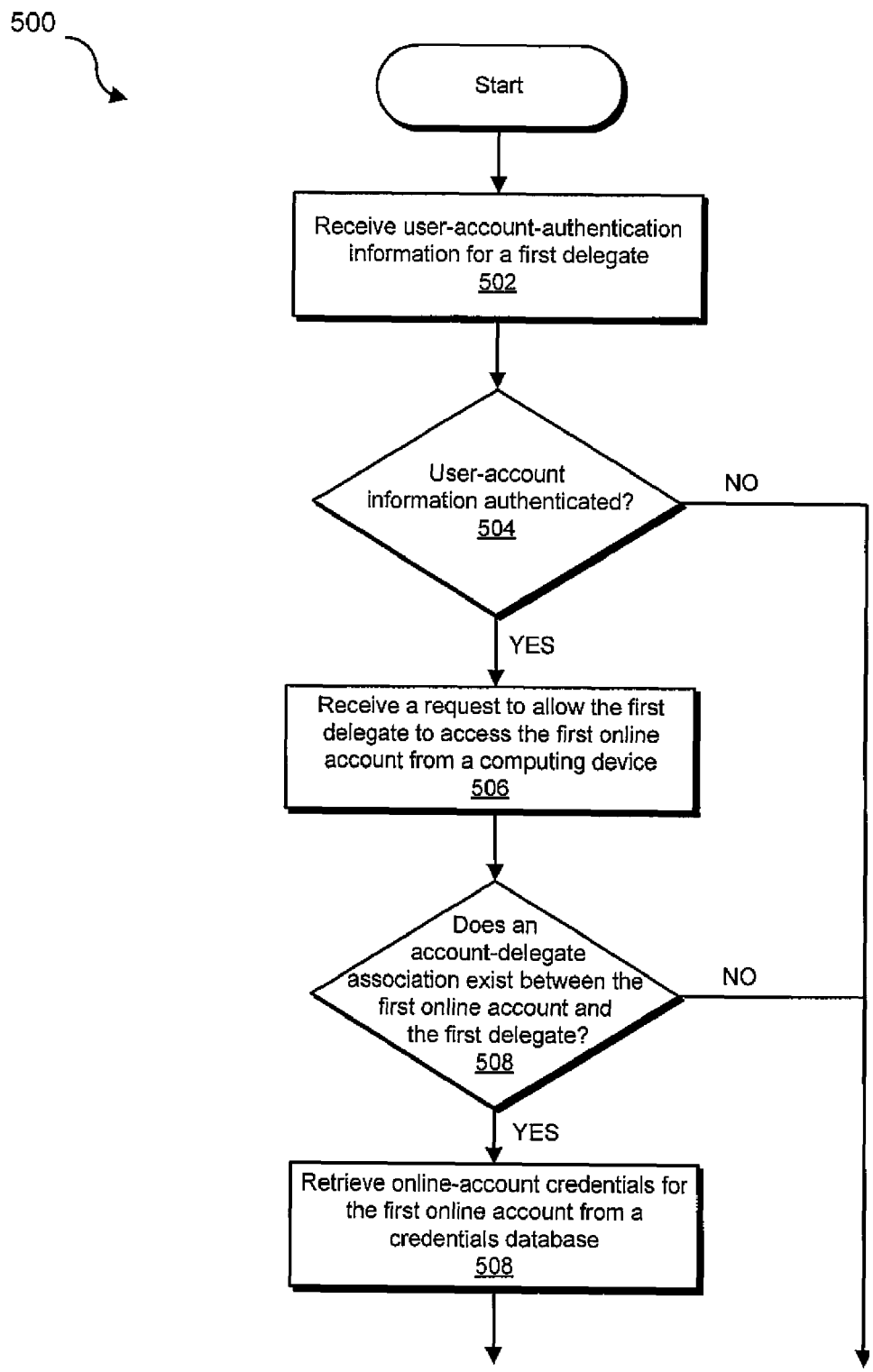
FIGS. 5A and 5B are flow diagrams of an exemplary computer-implemented method for delegating access to online accounts and for facilitating delegates' access to these online accounts according to an additional embodiment.
Figure 5B:
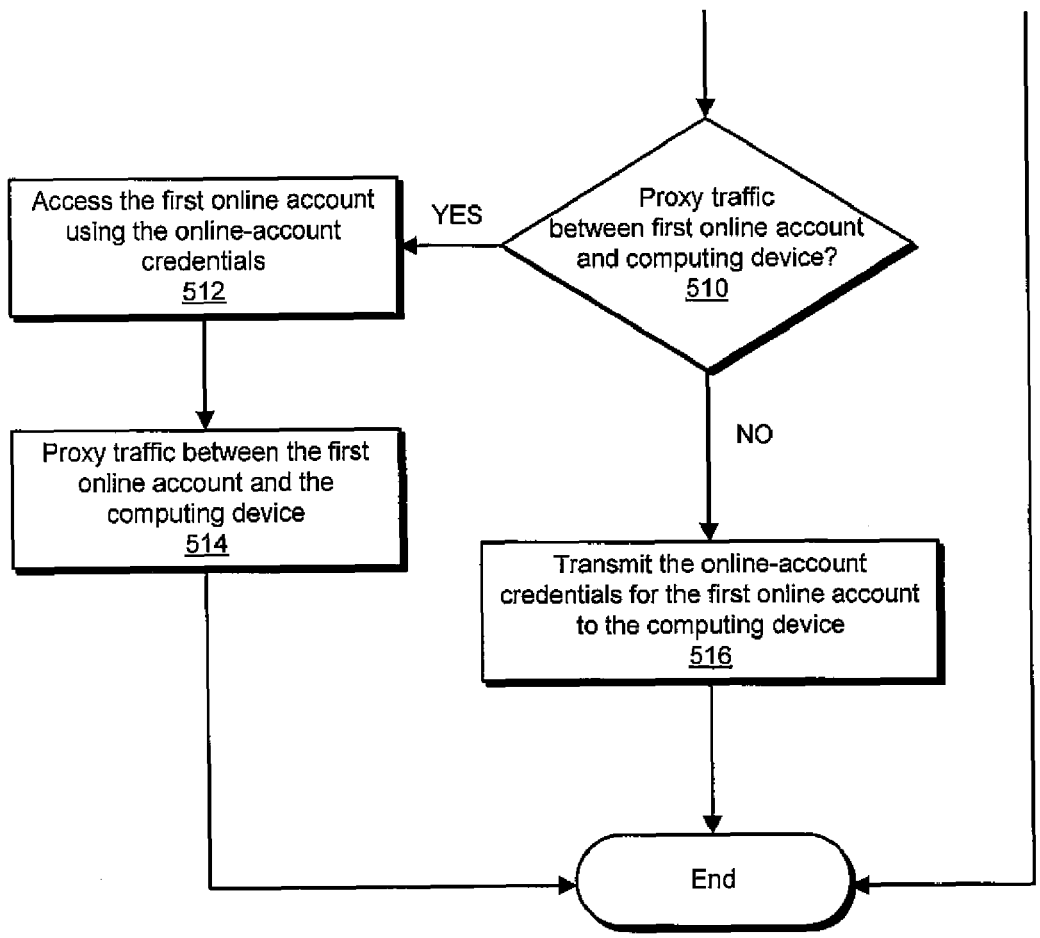
Figure 6:
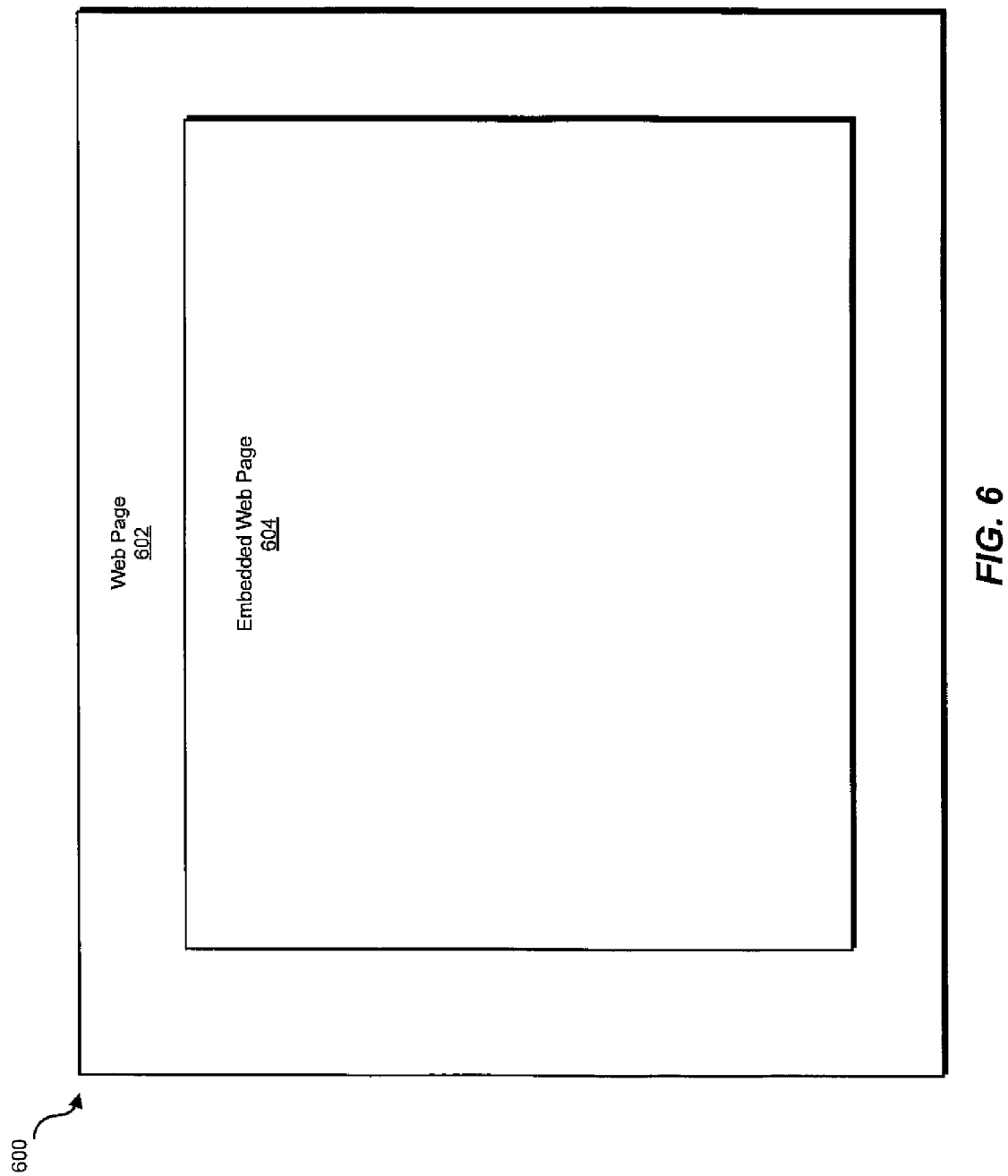
FIG. 6 is a block diagram of an exemplary web page for delegating access to online accounts and for facilitating delegates' access to these online accounts according to at least one embodiment.

FIGS. 5A and 5B are flow diagrams of an exemplary computer-implemented method 500 for delegating access to online accounts and for facilitating delegates' access to these online accounts according to an additional embodiment. As illustrated in these figures, at step 502 a computing device, such as server 308 in FIG. 3, may receive user-account-authentication information for a first delegate. As detailed above, this user-account-authentication information may be used to authenticate the identity of the delegate with server 308. For example, server 308 in FIG. 3 may determine whether the user-account-authentication information received from the delegate matches user-account-authentication information contained in credentials database 114. If the computing device is able to authenticate the delegate, then control proceeds from decision step 504 to step 506. Otherwise, control of exemplary method 500 terminates.

At step 506, the computing device may receive a request from a computing device to allow the first delegate to access the first online account. For example, server 308 in FIG. 3 may receive a request from client 302, which may be operated by a delegate, to allow the delegate to access online account 306. Although not illustrated, in certain embodiments server 308 may, upon receiving this request from client 302, access the delegate's accessible-accounts table 144 in the delegate's user account 140 in account-delegate-associations database 118 in FIG. 2A to determine whether the delegate has been granted access to online account 306.

If the delegate has been delegated access to the first online account, then at step 508 the computing device may retrieve online-account credentials for the first online account from the credentials database. For example, server 308 in FIG. 3 may retrieve online-account credentials 122 from the delegator's user account 120 in credentials database 114 in FIG. 2A.

At step 510, the computing device may determine whether it is to proxy traffic between the first online account and the computing device. If so, control proceeds to step 512, where the computing device accesses the first online account using the online-account credentials retrieved from the credentials database. For example, server 308 in FIG. 3 may access online account 306 using the online-account credentials 122 associated with online account 306. At step 514, the computing device may proxy traffic between the first online account and the computing device. For example, server 308 in FIG. 3 may proxy traffic between online account 306 and client 302 via network 304.

A computing device may proxy traffic between an online account and a computing device in a variety of ways. For example, server 308 in FIG. 3 may proxy requests from client 302 to online account 306 and/or data received from online account 306 to client 302. In certain embodiments, server 308 may proxy traffic between online account 306 and client 302 by retrieving a webpage, such as webpage 604 in FIG. 6, and then embedding this webpage within an additional webpage or sub frame, such as webpage or sub frame 602 in FIG. 6. Server 308 may then transmit webpage 602 containing the embedded webpage 604 to client 302.

Returning to FIGS. 5A and 5B, if at step 510 the computing device determines that it is not required to proxy traffic between the first online account and the computing device, then at step 516 the computing device may transmit the online-account credentials for the first online account that it retrieved from the credentials database to the computing device. For example, server 308 may transmit online-account credentials 122 for online account 306 to client 302 in FIG. 3. Upon completion of step 514 and/or 516, exemplary method 500 may terminate.

Figure 7:
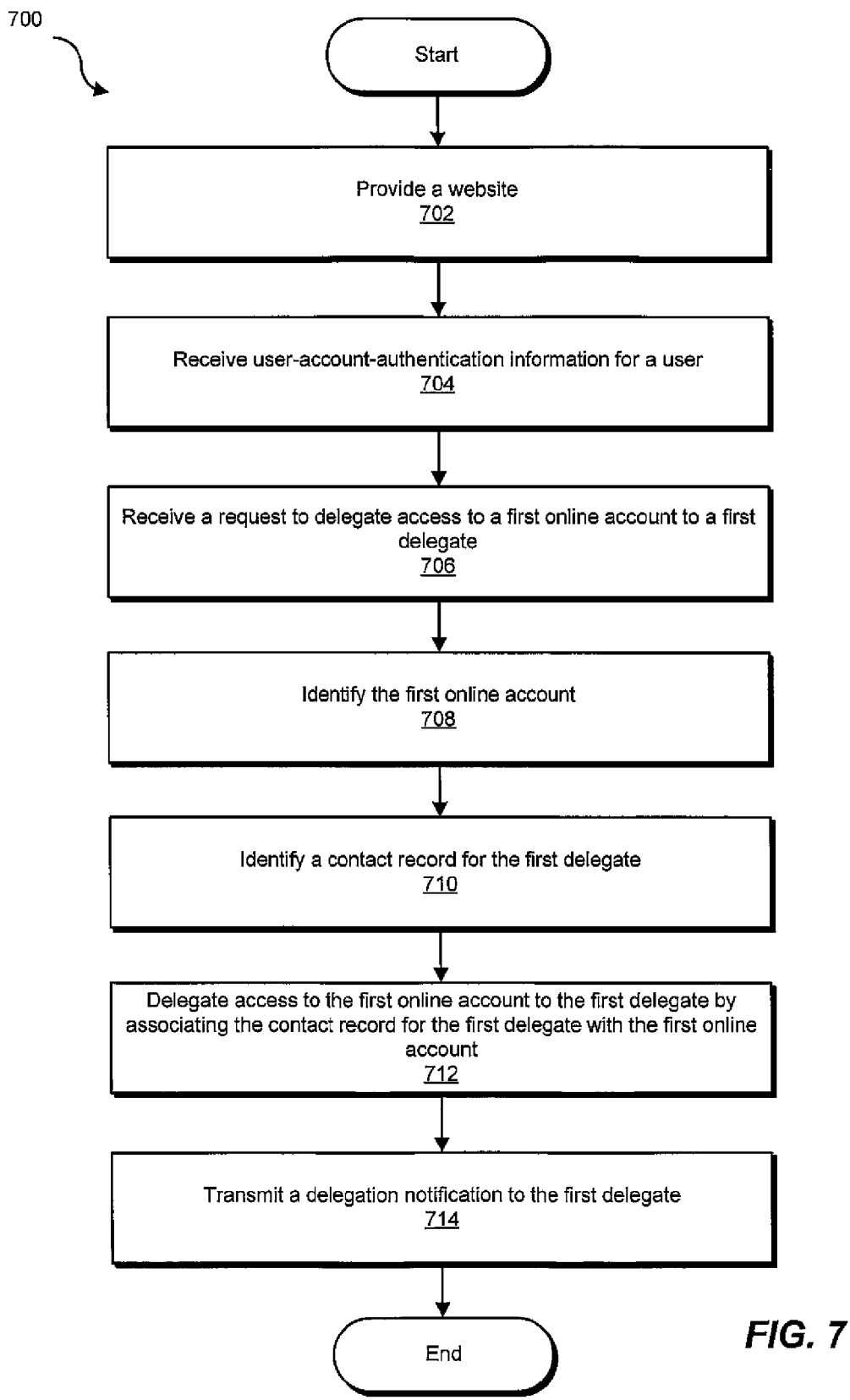
FIG. 7 is a flow diagram of an exemplary computer-implemented method for delegating access to online accounts and for facilitating delegates' access to these online accounts according to an additional embodiment.

As detailed above, embodiments of the instant disclosure may also include providing a website that allows a user to perform various tasks. FIG. 7 is a flow diagram of an exemplary computer-implemented method for providing a website, such as website 800 in FIG. 8, that may allow a user to perform various tasks. As illustrated in FIG. 8, website 800 may allow a user to perform one or more actions 806 in connection with one or more online accounts 802 and one or more delegates 804. For example, a user may delegate access to the user's online banking account by adding one or more delegates using website 800. A user may also add, modify, and/or delete the online-account credentials that are used to access the user's online banking account.

A user may also revoke access to online accounts from delegates and/or modify delegates' access to online accounts by interfacing with website 800. For example, a user may revoke access rights from the delegate Susan B. Brown by interfacing with website 800. Similarly, a user may modify the access rights of delegate John R. Smith by interfacing with website 800. For example, a user may modify a delegation-expiration date associated with delegate John R. Smith. Returning to FIG. 7, at step 704 a computing device may receive user-account-authentication information for a user. In this embodiment, this user-account-authentication information may be received via website 800 in FIG. 8. At step 706, the computing device may receive a request, via website 800 in FIG. 8, to delegate access to a first online account to a first delegate. For example, a user of website 800 in FIG. 8 may request that the delegate Jason Roberts be delegated access to the user's email account by interfacing with website 800.

At step 708, the computing device may identify the first online account. For example, server 308 in FIG. 3 may access the user's account 120 in credentials database 114 and identify online-account credentials 122 for the user's email account. At step 710, the computing device may identify the contact record for the first delegate. For example, server 308 in FIG. 3 may access the user's account 130 in delegate-community database 116 in FIG. 2A and identify a contact record 132 associated with the delegate Jason Roberts.

At step 712, the computing device may delegate access to the first online account to the first delegate by associating the contact record or the first delegate with the first online account. For example, server 308 in FIG. 3 may access a user's account 140 in account-delegate-associations database 118 and retrieve a delegated-accounts table 142 from this user's account 140. Server 308 may then create an entry in delegated-accounts table 142 that identifies, for example, a relationship between the user's email account and the delegate Jason Roberts. In addition, server 308 may retrieve an accessible-accounts table 144 from the delegate's user account 140 in account-delegate-associations database 118 in FIG. 2A and then create an entry in the delegate's accessible-accounts table 144 that identifies the name of the user/delegator and the email account of the user/delegator.

At step 714, the computing device may transmit a delegation-notification to the first delegate. For example, server 308 in FIG. 3 may transmit an email notification or other form of message to the delegate Jason Roberts that identifies the email account that Mr. Roberts has been delegated access to. Upon completion of step 714, exemplary method 700 in FIG. 7 may terminate.

Although not illustrated, exemplary methods 500 and/or 700 may also comprise delegating access to a first online account to a second delegate. For example, exemplary methods 500 and/or 700 may comprise receiving a second request to delegate access to a first online account of a user to a second delegate, identifying the first online account, identifying a contact record for the second delegate, and delegating access to the first online account to the second delegate by associating the contact record for the second delegate with the first online account.

Figure 9:
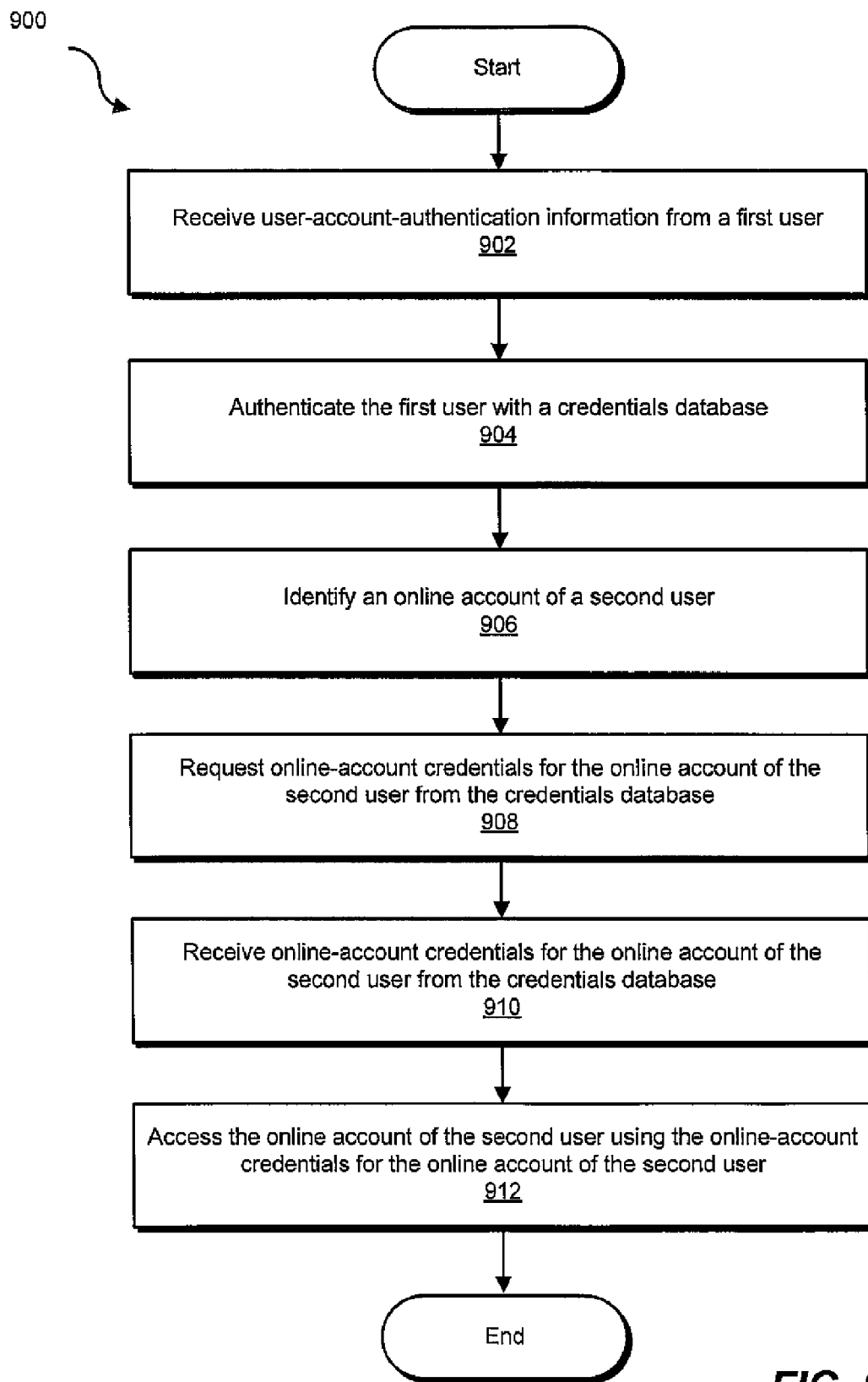
FIG. 9 is a flow diagram of an exemplary computer-implemented method for facilitating delegates' access to online accounts according to at least one embodiment.

As detailed above, one or more embodiments of the instant disclosure may also facilitate a delegate's access to online accounts. FIG. 9 is a flow diagram of an exemplary computer-implemented method 900 for facilitating delegates' access to online accounts according to at least one embodiment. In this example, one or more of modules 102 in FIG. 1 may be installed and configured to run on both client 302 and server 308 in FIG. 3. In addition, server 308 may comprise one or more of databases 112.

As illustrated in FIG. 9, at step 902 a computing device, such as client 302 in FIG. 3, may receive user-account-authentication information from a first user. At step 904, the computing device may authenticate the first user with a credentials database by transmitting the user-account-authentication information received from the first user to the credentials database. For example, client 302 in FIG. 3 may authenticate a user of client 302 by transmitting user-account-authentication information received from the user to server 308.

At step 906, the computing device may identify an online account of a second user. Online accounts of the second user may be identified in a variety of way. For example, in certain embodiments a software application or plug-in, such as a browser plug-in, running on client 302 in FIG. 3 may, as a user of client 302 visits an online website, determine that an account required to access the online website is associated with a second user (that is, a user that is different from the user of client 302).

Upon identifying an online account of a second user, at step 908 the computing device may request online-account credentials for the online account of the second user from the credentials database. For example, client 302 in FIG. 3 may request online-account credentials for online account 306 from server 308. At step 910, the computing device may receive online-account credentials for the online account of the second user from the credentials database. For example, client 302 in FIG. 3 may receive online-account credentials for online account 306 from server 308 via network 304 in FIG. 3.

At step 912, the computing device may access the online account of the second user using the online-account credentials received from the credentials database. For example, client 302 may, using the online-account credentials for online account 306 received from server 308, access online account 306. In certain embodiments, accessing the online account for the second may comprise automatically logging into the online account of the second user without exposing the online-account credentials to the first user. For example, authentication module 110 in FIG. 1 may be installed and configured to run on client 302. In this example, authentication module 110 may, upon receiving online-account credentials for online account 306 in FIG. 3 from server 308, access online account using these online-account credentials without exposing these online-account credentials to a user of client 302. In this example, authentication module 110 may represent a software application or plugin, such as a browser plugin, that operates in a transparent manner to a user of client 302. Upon completion of step 912 in FIG. 9, exemplary method 900 may terminate.

Figure 10:
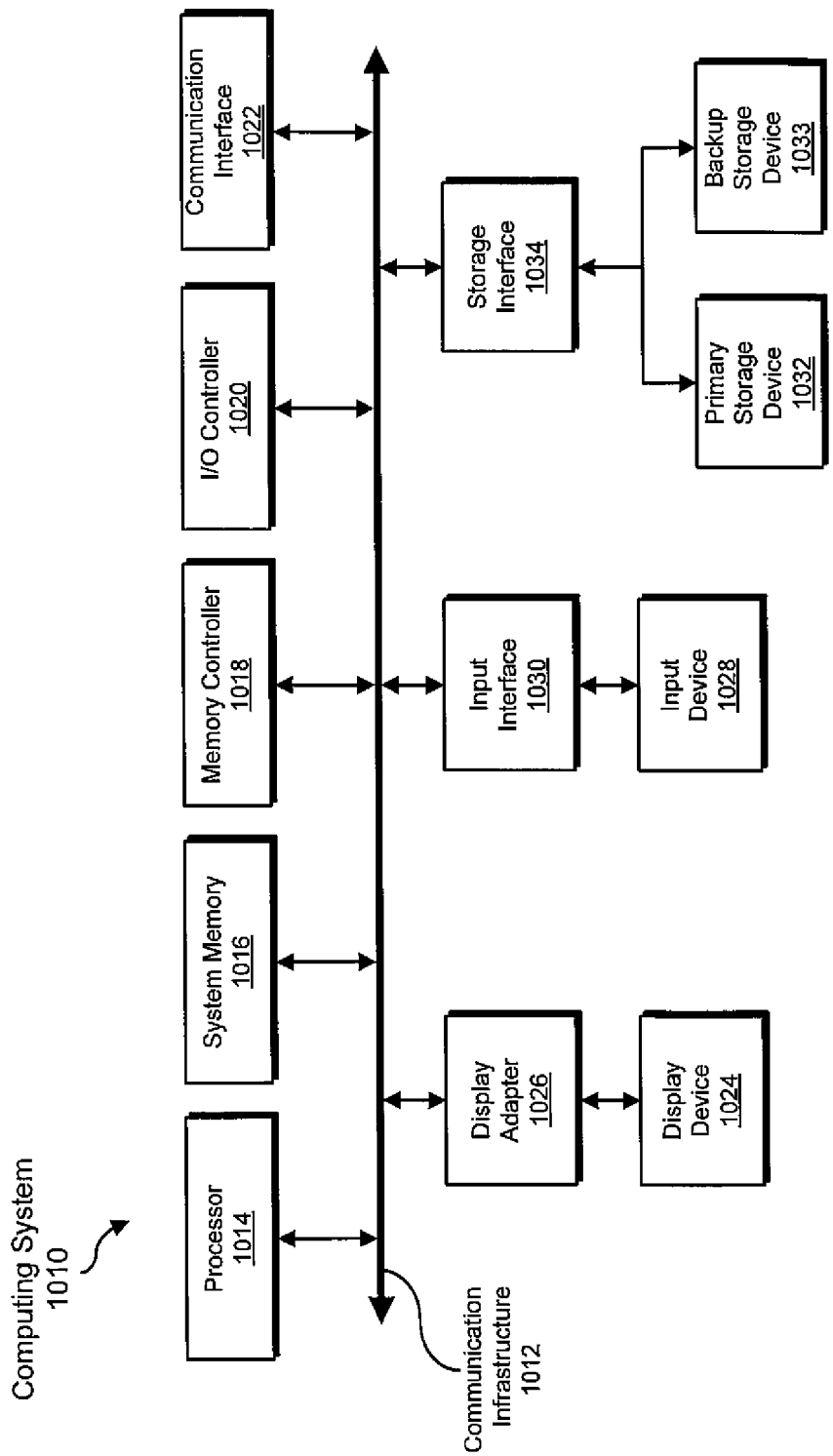
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may comprise at least one processor 1014 and a system memory 1016.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the exemplary embodiments described and/or illustrated herein. For example, processor 1014 may perform and/or be a means for performing, either alone or in combination with other elements, one or more of the receiving, identifying, delegating, associating, disassociating, creating, revoking, retrieving, accessing, transmitting, authenticating, requesting, and logging into steps described herein. Processor 1014 may also perform and/or be a means for performing any other steps, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may comprise both a volatile memory unit (such as, for example, system memory 1016) and a non-volatile storage device (such as, for example, primary storage device 1032, as described in detail below).

In certain embodiments, exemplary computing system 1010 may also comprise one or more components or elements in addition to processor 1014 and system memory 1016. For example, as illustrated in FIG. 10, computing system 1010 may comprise a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an ISA, PCI, PCIe, or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller may perform and/or be a means for performing, either alone or in combination with other elements, one or more of the steps or features described and/or illustrated herein, such as receiving, identifying, delegating, associating, disassociating, creating, revoking, retrieving, accessing, transmitting, authenticating, requesting, and logging into.

I/O controller 1020 generally represents any type or form of module capable of coordinating and/or controlling the input and output functions of a computing device. For example, in certain embodiments I/O controller may control or facilitate transfer of data between one or more elements of computing system 1010, such as processor 1014, system memory 1016, communication interface 1022, display adapter 1026, input interface 1030, and storage interface 1034. I/O controller 1020 may be used, for example, to perform and/or be a means for performing, either alone or in combination with other elements, one or more of the receiving, identifying, delegating, associating, disassociating, creating, revoking, retrieving, accessing, transmitting, authenticating, requesting, and logging into steps described herein. I/O controller 1020 may also be used to perform and/or be a means for performing other steps and features set forth in the instant disclosure.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network comprising additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution. In certain embodiments, communication interface 1022 may perform and/or be a means for performing, either alone or in combination with other elements, one or more of the receiving, identifying, delegating, associating, disassociating, creating, revoking, retrieving, accessing, transmitting, authenticating, requesting, and logging into steps disclosed herein. Communication interface 1022 may also be used to perform and/or be a means for performing other steps and features set forth in the instant disclosure.

As illustrated in FIG. 10, computing system 1010 may also comprise at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also comprise at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device. In at least one embodiment, input device 1028 may perform and/or be a means for performing, either alone or in combination with other elements, one or more of the receiving, identifying, delegating, associating, disassociating, creating, revoking, retrieving, accessing, transmitting, authenticating, requesting, and logging into steps disclosed herein. Input device 1028 may also be used to perform and/or be a means for performing other steps and features set forth in the instant disclosure.

As illustrated in FIG. 10, exemplary computing system 1010 may also comprise a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also comprise other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

In certain embodiments, the exemplary file systems disclosed herein may be stored on primary storage device 1032, while the exemplary file-system backups disclosed herein may be stored on backup storage device 1033. Storage devices 1032 and 1033 may also be used, for example, to perform and/or be a means for performing, either alone or in combination with other elements, one or more of the receiving, identifying, delegating, associating, disassociating, creating, revoking, retrieving, accessing, transmitting, authenticating, requesting, and logging into steps disclosed herein. Storage devices 1032 and 1033 may also be used to perform and/or be a means for performing other steps and features set forth in the instant disclosure.

Many other devices or subsystems may be connected to computing system 1010. Conversely, all of the components and devices illustrated in FIG. 10 need not be present to practice the embodiments descried and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an application specific integrated circuit (ASIC) adapted to implement one or more of the exemplary embodiments disclosed herein.

Figure 11:
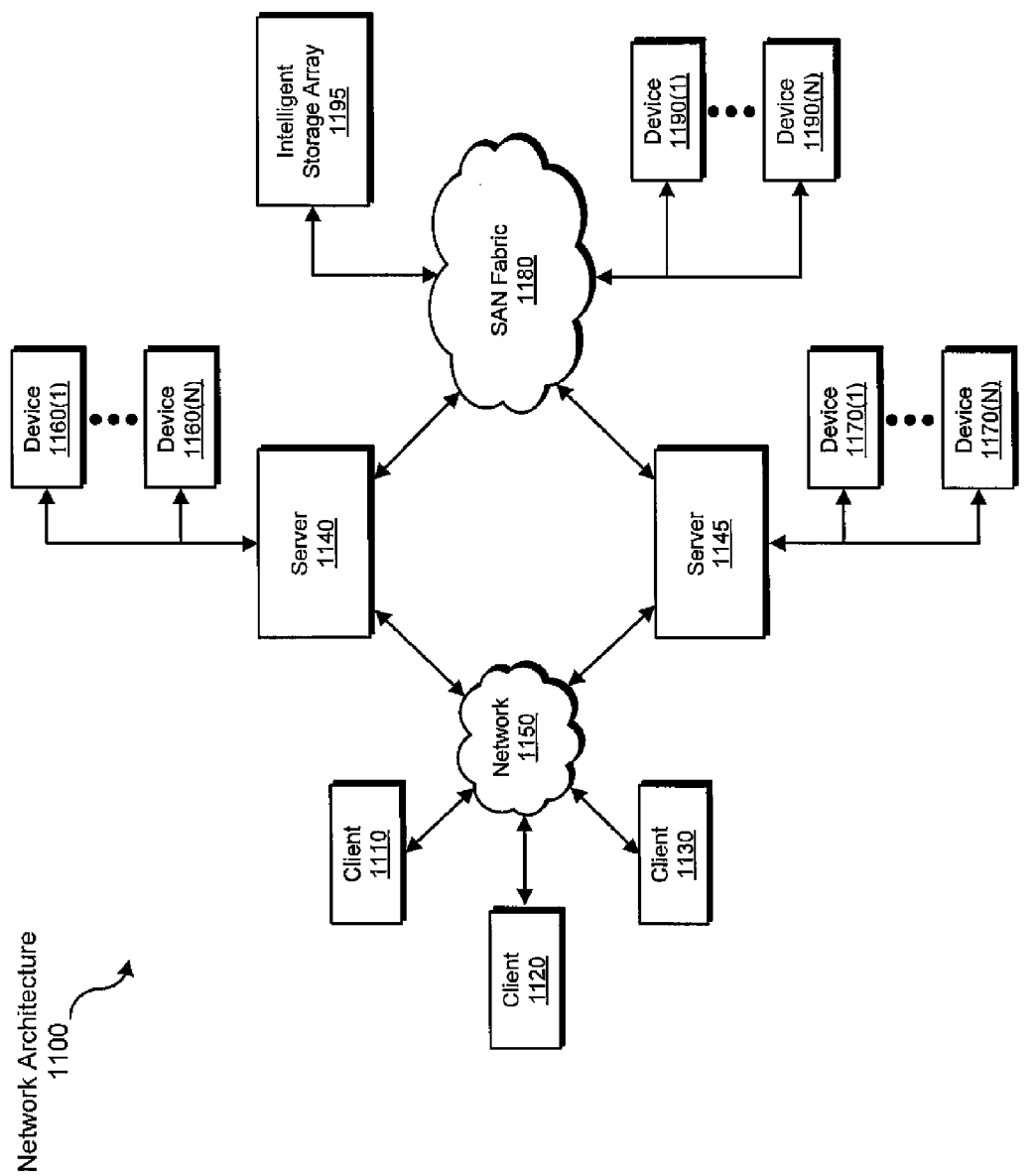
FIG. 11 is a block diagram of an exemplary computing network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or to run certain software applications. Network 1150 generally represents any telecommunication or computer network; including, for example, an intranet, a wide area network (WAN), a local area network (LAN), a personal area network (PAN), or the Internet.

As illustrated in FIG. 11, one or more storage devices 1160(1)-(N) may be directly attached to server 1140. Similarly, one or more storage devices 1190(1)-(N) may be directly attached to server 1145. Storage devices 1160(1)-(N) and storage devices 1190(1)-(N) generally represent any type or form of storage device or medium capable of storing data and/or other computer-readable instructions. In certain embodiments, storage devices 1160(1)-(N) and storage devices 1190(1)-(N) may represent network-attached storage (NAS) devices configured to communicate with servers 1140 and 1145 using various protocols, such as NFS, SMB, or CIFS.

Servers 1140 and 1145 may also be connected to a storage area network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160(1)-(N), storage devices 1170(1)-(N), storage devices 1190(1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150. Accordingly, network architecture 1100 may perform and/or be a means for performing, either alone or in combination with other elements, one or more of the receiving, identifying, delegating, associating, disassociating, creating, revoking, retrieving, accessing, transmitting, authenticating, requesting, and logging into steps disclosed herein. Network architecture 1100 may also be used to perform and/or be a means for performing other steps and features set forth in the instant disclosure.

As detailed above, computing system 1010 and/or one or more of the components of network architecture 1100 may perform and/or be a means for performing, either alone or in combination with other elements, one or more steps of the exemplary methods described and/or illustrated herein. In one embodiment, this exemplary computer-implemented method may comprise receiving a request to delegate access to a first online account of a user to a first delegate, identifying the first online account, identifying a contact record for the first delegate, and delegating access to the first online account to the first delegate by associating the contact record for the first delegate with the first online account.

The method may also comprise, prior to receiving the request, receiving user-account-authentication information for the user. In addition, associating the contact record for the first delegate with the first online account may comprise creating an entry in the user's delegated-accounts table. In certain embodiments, this entry may identify a relationship between the first online account and the delegate. In addition, associating the contact record for the first delegate with the first online account may comprise creating an entry in the first delegate's accessible-accounts table.

In at least one embodiment, a request may specify a delegation-expiration date. In addition, the method may further comprise revoking access to the first online account from the first delegate by disassociating the contact record for the first delegate from the first online account. The method may also further comprise receiving a request to access the first online account form a computing device, retrieving online-account credentials for the first online account from a credentials database, accessing the first online account using the online-account credentials, receiving data from the first online account, and transmitting at least a portion of the data received from the first online account to the computing device.

In certain embodiments, receiving data from the first online account may comprise retrieving a webpage from the first online account. In addition, transmitting data received from the first online account to the computing device may comprise embedding the webpage retrieved from the first online account and transmitting the embedded webpage to the computing device. The method may also comprise, prior to retrieving online-account credentials for the first online account, receiving user-account-authentication information from the computing device.

In certain embodiments, the method may further comprise receiving a request to access the first online account from an authentication module running on a computing device, retrieving online-account credentials for the first online account from a credentials database, and transmitting the online-accounts credentials for the first online account to the authentication module running on the computing device. In at least one embodiment, the request may comprise user-account-authentication information for the first delegate.

The method may also comprise receiving a second request to delegate access to the first online account to a second delegate, identifying the first online account, identifying a contact record for the second delegate, and delegating access to the first online account to the second delegate by associating the contact record for the second delegate with the first online account.

The method may also comprise providing a website that allows a user to: 1) add, modify, and delete online-account credentials, 2) add, modify, and delete contacts records for delegates, 3) grant access to online accounts to delegates, 4) revoke access to online accounts from delegates, and 5) modify delegates' access to online accounts. The method may also comprise transmitting a delegation-notification to the first delegate.

In addition, a computer-implemented method for accessing delegated online accounts may comprise receiving user-account-authentication from a first user, authenticating the first user with a credentials database by transmitting the user-account-authentication information for the first user to the credential database, identifying an online account of a second user, requesting online-account credentials for the online account for the second user from the credentials database, receiving online-account credentials for the online account of the second user from the credentials database, and accessing the online account of the second user using the online-account credentials for the online account of the second user.

In certain embodiment, accessing the online account of the second user may comprise automatically logging in to the online account of the second user without exposing the online-account credentials for the online account of the second user to the first user. In addition, the method may comprise identifying an account-delegate association between the first user and the online account of the second user.

Computing system 1010 and/or one or more of the components of network architecture 1100 may also represent all or portions of exemplary system 100 in FIG. 1. For example, computing system 1010 and/or one or more of the components of network architecture 1100 may represent portions of a system for delegating access to online accounts that comprises a delegation module for: 1) receiving a request to delegate access to a first online account of a user to a first delegate, 2) identifying the first online account, 3) identifying a contact record for the first delegate, and 4) delegating access to the first online account to the first delegate by associating the contact record for the first delegate with the first online account.

This system may also comprise a credentials database for storing online-account credentials and user-account-authentication information, a delegate-community database for storing contact records for users, and an account-delegate-associations database for storing account-delegate associations. The system may also comprise a credentials-management module for managing the online-account credentials and the user-account authentication information. In addition, the system may comprise a community-management module for managing the contact records, a delegation module for managing the account-delegate associations, and an authentication module for access online accounts using the online-account credentials.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for delegating access to online accounts, at least a portion of the method being performed by a server-side computing device comprising at least one processor, the method comprising:

receiving, at the server-side computing device, at least one request from an account owner to delegate access to at least one online account of the account owner, wherein the online account is provided by an online service and the request specifies at least one delegate that is to receive access to the online account;

delegating access to the online account to the delegate specified in the request by:
identifying, at the server-side computing device, a contact record for the delegate;
associating, at the server-side computing device, the contact record for the delegate with the online account;

enabling the delegate to access the online account using the account owner's existing online-account credentials for accessing the online account without exposing the account owner's existing online-account credentials to the delegate by:

receiving, at the server-side computing device, a request to access the online account from a browser plug-in running on the delegate's computing device, the request comprising user-account-authentication information for authenticating the delegate with the server-side computing device;

using the user-account-authentication information to authenticate the delegate at the server-side computing device;

identifying, at the server-side computing device, the account owner's existing online-account credentials for accessing the online account;

providing the account owner's existing online-account credentials from the server-side computing device to the browser plug-in running on the delegate's computing device to enable the browser plug-in running on the delegate's computing device to automatically log into the online account using the account owner's existing online-account credentials without exposing the account owner's existing online-account credentials for the online account to the delegate.

2. The method of claim 1, further comprising, prior to delegating access to the online account to the delegate specified in the request, authenticating the account owner by receiving and authenticating user-account-authentication information for the account owner.

3. The method of claim 1, wherein associating the contact record for the delegate in question with the online account comprises creating an entry in a delegated-accounts table associated with the account owner.

4. The method of claim 3, wherein the entry identifies a relationship between the online account and the delegate in question.

5. The method of claim 1, wherein associating the contact record for the delegate in question with the online account comprises creating an entry in an accessible-accounts table associated with the delegate in question that identifies a relationship between the online account and the delegate in question.

6. The method of claim 1, wherein the request specifies a delegation-expiration date.

7. The method of claim 1, further comprising revoking access to the online account from the delegate in question by disassociating the contact record for the delegate in question from the online account.

8. The method of claim 1, further comprising providing a website that allows the account owner to:
add, modify, and delete online-account credentials;
add, modify, and delete contact records for delegates;
grant access to online accounts to delegates;
revoke access to online accounts from delegates;
modify delegates' access to online accounts.

9. The method of claim 1, further comprising transmitting a delegation-notification to the delegate that identifies the online account to which the delegate has been granted access.

10. A system for delegating access to online accounts, the system comprising:

a delegation module programmed to cause a server-side computing device to:
receive, at the server-side computing device, at least one request from an account owner to delegate access to at least one online account of the account owner, wherein the online account is provided by an online service and the request specifies at least one delegate that is to receive access to the online account;

delegate access to the online account to the delegate specified in the request by:
identifying, at the server-side computing device, a contact record for the delegate; associating, at the server-side computing device, the contact record for the delegate with the online account;

enable the delegate to access the online account using the account owner's existing online-account credentials for accessing the online account without exposing the account owner's existing online-account credentials to the delegate by:

receiving, at the server-side computing device, a request to access the online account from a browser plug-in running on the delegate's computing device, the request comprising user-account-authentication information for authenticating the delegate with the server-side computing device;

using the user-account-authentication information to authenticate the delegate at the server-side computing device;

identifying, at the server-side computing device, the account owner's existing online-account credentials for accessing the online account;

providing the account owner's existing online-account credentials from the server-side computing device to the browser plug-in running on the delegate's computing device to enable the browser plug-in running on the delegate's computing device to automatically log into the online account using the account owner's existing online-account credentials without exposing the account owner's existing online-account credentials for the online account to the delegate;

at least one processor configured to execute the delegation module.

11. The system of claim 10, further comprising:
a credentials database that stores online-account credentials and user-account-authentication information;
a delegate-community database that stores contact records for account owners;
an account-delegate-associations database that stores account-delegate associations.

12. The system of claim 10, further comprising:
- a credentials-management module programmed to manage online-account credentials and user-account-authentication information;
- a community-management module programmed to manage contact records;
- an authentication module programmed to access online accounts using online-account credentials.

13. The method of claim 1, wherein enabling the delegate to access the online account using the account owner's existing online-account credentials for accessing the online account without exposing the account owner's existing online-account credentials to the delegate further comprises proxying traffic between the online account and the delegate.

14. The method of claim 13, wherein proxying traffic between the online account and the delegate comprises:
- using the account owner's existing online-account credentials to access the online account at the server-side computing device;
- retrieving data from the online account at the server-side computing device;
- transmitting at least a portion of the data retrieved from the online account to the browser plug-in running on the delegate's computing device.

15. The method of claim 14, wherein:
- retrieving the data from the online account comprises retrieving a web page from the online account;
- transmitting at least a portion of the data retrieved from the online account to the browser plug-in running on the delegate's computing device comprises:
  - embedding the webpage retrieved from the online account within an additional webpage;
  - transmitting the additional webpage that contains the embedded webpage to the browser plug-in running on the delegate's computing device.

16. The method of claim 1, wherein the request comprises a request from the account owner to delegate access to a plurality of online accounts of the account owner that are provided by a plurality of distinct types of online services.

17. The method of claim 16, wherein the distinct types of online services comprise a combination of two or more of:
- an email service;
- a website;
- an instant-messaging service;
- an online investment service;
- an online banking service;
- a file-distribution service.

* * * * *